United States Patent
Driscoll et al.

(10) Patent No.: US 10,706,410 B2
(45) Date of Patent: Jul. 7, 2020

(54) SERVICE-HOSTED PAYMENT REQUEST

(71) Applicant: MICROSOFT TECHNOLOGY LICENSING, LLC, Redmond, WA (US)

(72) Inventors: Daniel J. Driscoll, Seattle, WA (US);
Trent J. Byfield, Seattle, WA (US);
Matthew S. Harlan, Seattle, WA (US);
Matthias B. Pisut, Issaquah, WA (US);
Jonathan L. Cutler, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 426 days.

(21) Appl. No.: 15/590,816

(22) Filed: May 9, 2017

(65) Prior Publication Data

US 2018/0330364 A1    Nov. 15, 2018

(51) Int. Cl.
| | |
|---|---|
| G06Q 20/10 | (2012.01) |
| G06Q 20/40 | (2012.01) |
| G06Q 20/36 | (2012.01) |
| G06Q 10/08 | (2012.01) |

(52) U.S. Cl.
CPC ........... *G06Q 20/36* (2013.01); *G06Q 10/083* (2013.01)

(58) Field of Classification Search
CPC ...... G06Q 20/10; G06Q 20/40; G06Q 20/405; G06Q 20/102; G06Q 20/322; G06Q 20/26; G06Q 20/3672; H04L 51/18
USPC ........................................................ 705/41
See application file for complete search history.

(56) References Cited

U.S. PATENT DOCUMENTS

| | | | |
|---|---|---|---|
| 7,861,252 B2 | 12/2010 | Uszok et al. | |
| 8,738,496 B2* | 5/2014 | Titus ..................... | G06Q 20/10 |
| | | | 235/380 |
| 9,092,776 B2* | 7/2015 | Dessert ................ | G06Q 20/40 |
| 2012/0166333 A1 | 6/2012 | von behren et al. | |
| 2013/0212007 A1* | 8/2013 | Mattsson ............. | G06Q 20/405 |
| | | | 705/39 |
| 2013/0297452 A1 | 11/2013 | Schreiner et al. | |

(Continued)

OTHER PUBLICATIONS

"Bringing the chat-bot to P2P Payments", https://chatbotsmagazine.com/bringing-the-chat-bot-to-p2p-payments-da0290737025, Published on: Jun. 24, 2016, 5 pages.

(Continued)

*Primary Examiner* — Clifford B Madamba
(74) *Attorney, Agent, or Firm* — Shook, Hardy and Bacon, L.L.P.

(57) ABSTRACT

Systems and methods are provided that enable a vendor to utilize a digital wallet service to complete an online transaction with a user via a messaging channel (e.g., a chat channel), in a scenario where the vendor does not have a front end application running on the user's client device (i.e., there is no mechanism for the vendor's web-based application, such as a bot, to communicate with a digital wallet application running on the user's device). An online digital wallet service generates and caches a payment request (which can be rendered at a later time by the digital wallet service for interaction with the user) which is requested by the vendor, and provides the vendor with a reference to the cached payment request. The vendor provides the reference to the user such that the user can access the payment request via the link.

20 Claims, 13 Drawing Sheets

(56) References Cited

U.S. PATENT DOCUMENTS

2014/0279050 A1    9/2014  Makar et al.
2015/0371173 A1   12/2015  Jalali
2016/0110718 A1    4/2016  Jajara et al.
2017/0250936 A1*   8/2017  Rosenberg .............. H04L 51/18

OTHER PUBLICATIONS

Bateman, et al., "Payment Request API", https://www.w3.org/TR/2016/WD-payment-request-20160421/, Published on: Apr. 21, 2016, 26 pages.

"How to Handle Asynchronous Payment Requests", http://www-01.ibm.com/support/docview.wss?uid=swg21556979, Retrieved on: Mar. 20, 2017, 2 pages.

Khan, Riyazuddin, "Digital Wallet Technology", In International Journal & Magazine of Engineering, Technology, Management and Research, Published on: Apr. 28, 2010, 15 pages.

* cited by examiner

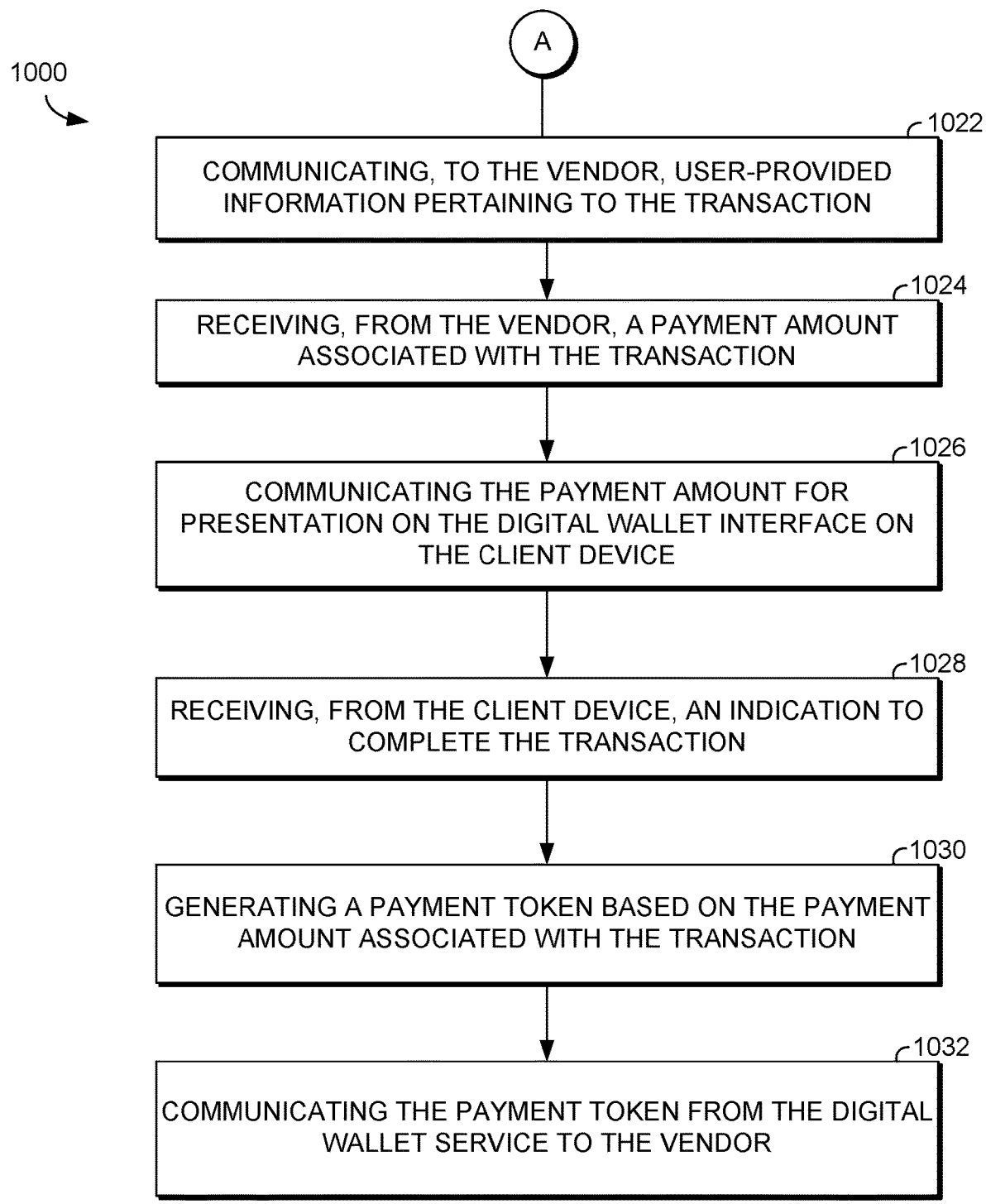

US 10,706,410 B2

SERVICE-HOSTED PAYMENT REQUEST

BACKGROUND

Digital wallets, also referred to as payment apps, such as Microsoft Wallet™, Apple Pay®, and Android Pay®, among others, are a convenient and commonly-used mechanism for submitting payments online. These types of payment methods may utilize protocols and application programming interfaces (APIs) developed by the World Wide Web Consortium (W3C®). As an example, when a user desires to make a purchase on a website using a mobile device, a computer, and so forth, the user doesn't necessarily want to enter credit card information into the website. However, if the user has a digital wallet account that stores the user's credit card information, and the website provides a payment option for that particular digital wallet, then the user can utilize the digital wallet to provide the payment information for the purchase. When the user selects the digital wallet payment option (such as by clicking on an icon on the website), the vendor's application may utilize payment request API calls which generate a payment request object containing information such as payment method identifiers and details about the transaction. The vendor application may then utilize an API call to trigger display of the digital wallet. A digital wallet interface is launched on the user device, e.g., a window opens which presents the digital wallet user interface, providing the user the option to log in, or to continue if already logged in. The digital wallet user interface, which is an application running locally on the client device, communicates with the website' s application (e.g., a javascript application) that is also running locally on the client device. The digital wallet interface may display information such as the user's payment instruments and shipping addresses that are on file with digital wallet service. The wallet also displays the payment request, e.g., the vendor-supplied information from the payment request object, such as an identification of accepted payment methods, potential shipping methods, and so forth. The user can select a payment method, shipping method, and so forth, but the digital wallet does not have the ability to calculate a payment amount for the transaction. That functionality lies with the product provider's application. The wallet may utilize API calls to communicate the user's selections to the product provider's application, which determines the total amount of the purchase based on the selections (e.g., different shipping addresses or shipping methods may incur different shipping costs) and provides the total amount to the digital wallet service, which presents the amount to the user. When the user confirms the transaction with the digital wallet service, the digital wallet service provides a secure payment token to the product provider's application running locally on the client. The product provider's application then completes the transaction utilizing the payment token, notifying the product provider's back end of the details of the transaction so that processing of the user's order (or whatever type of transaction) can take place. A key portion of the above-described process is the communication that is required between the digital wallet application and the product provider's application. The required communication is possible because both applications are running locally on the client device.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

An embodiment is directed toward systems and methods for enabling a product provider, utilizing a communication channel which does not allow for the product provider to utilize a front end application running in the buyer's web browser, to create a payment request which can be rendered for interaction with a digital wallet at a later point in time.

BRIEF DESCRIPTION OF THE DRAWINGS

Aspects of the invention are described in detail below with reference to the attached drawing figures, wherein.

DETAILED DESCRIPTION

Figure 1:
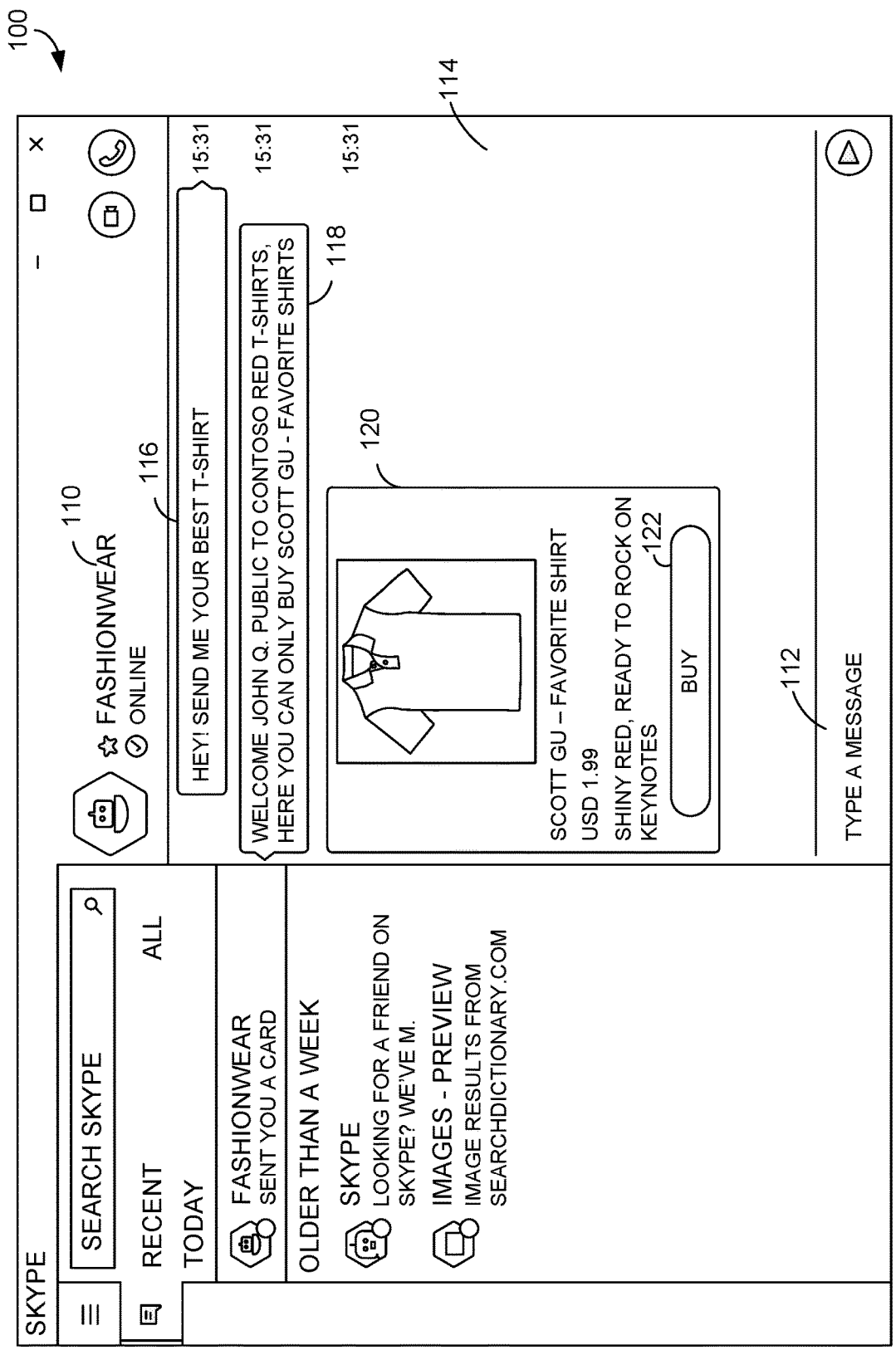
FIG. 1 is a diagram which illustrates an example messaging session for utilizing a service-hosted payment request to complete an online transaction, and is suitable for implementing some aspects of the invention.

Third-party providers commonly conduct transactions with users online. Third-party providers typically include merchants and service providers, and may include other types of entities having an online presence. For example, a merchant may offer products for sale such as furniture, books, appliances, electronics, automobiles, and any number of other types of products. A service provider may offer services such as lawn care, Internet access, tax preparation, legal advice, financial advice, cleaning services, and any number of other types of services. The term "vendor" as used herein includes merchants, service providers, and any type of entity that offers transactions online in exchange for payment or other compensation.

Conventionally, interacting with a digital wallet requires that a vendor utilize its own front end application running on the user's client device. For example, a vendor may present an offer either on a web page (e.g., a car dealership may present an offer on the car dealership's own web page running within a browser on the user's client device), or within a dedicated app (e.g., a pizza restaurant may present an offer via the pizza restaurant's mobile app installed on the user's client device). The need for a front end application is that payment with a digital wallet requires communication between the digital wallet and the vendor (i.e., the vendor's server or back end). The digital wallet may run on the user's client device as a website presented in the user's browser (e.g., as a javascript application), or as a dedicated application installed on the user device (e.g., a mobile app). The digital wallet, running on the user's client device, can interact with the user and receive and store the user's information such as payment instruments, shipping addresses, and so forth, but cannot perform tasks that are transaction specific, such as such as calculating shipping costs, determining sales tax, and so forth. Tasks such as those fall under the purview of the vendor that is offering the transaction. Because the digital wallet and the vendor's application are both running on the user's client device, the wallet and the vendor's application can communicate with each other to facilitate completion of the transaction. For example, the digital wallet may inform the vendor (via the vendor's application running on the client device) of the user's payment instrument and shipping address. The vendor's front end application may have the ability to calculate a final payment amount based on shipping costs and so forth, or may communicate the user's information to the vendor's back end, which may then calculate the payment amount and communicate it to the vendor's front end application. The vendor's front end application may then communicate the payment amount to the digital wallet, which presents the amount to the user. Upon approval by the user, the digital wallet may create a secure payment token and provide it to the vendor's application, which may then proceed with completing the online transaction.

Vendors sometimes communicate with users through communication channels that do not enable the vendor to run its own application on the user's client device. For example, a vendor may utilize a web agent, such as a chatbot, which communicates with a user via a messaging channel, such as an IRC chat channel. In that case, although the messaging (or chat) client may be running on the user's device, the vendor is not running its own front end application on the client device. Thus, if the vendor presents an offer of a transaction to the user via the chat channel, there is no mechanism that would enable a digital wallet, running on the user's client device, to communicate with the vendor via the messaging channel. Thus, the digital wallet has no way to generate a payment request for the transaction, or to provide the user's information (such as payment instrument and shipping address) to the third-party provider via the chat channel. If the user wishes to accept the transaction, he or she would have to manually enter payment information and shipping information into the communication with the chatbot.

Conventionally, an approach sometimes utilized by vendors to receive payment via a messaging channel is to request payment via a funds-transfer application, such as PayPal™. However, a conventional funds-transfer type transaction is static, i.e., it does not permit dynamic updating of a payment amount by the vendor, for example, if the shipping address or shipping method is changed by the user, or if a product's price or availability changes on the vendor's end.

Some embodiments of the technology described herein are directed toward systems and methods for enabling a vendor to offer a product or service and complete the transaction using a digital wallet, while utilizing a communication channel which does not allow for the vendor to have a front end application running on the user's client device. More particularly, some embodiments provide a means for a digital wallet application to generate and cache a payment request (which can be rendered at a later time for interaction with a user) that has been requested by a vendor, in a circumstance in which the vendor does not have its own application running on the client device, i.e., communication between the vendor and the digital wallet does not occur on the user's client device.

In one embodiment, a vendor communicating with a user via a chat infrastructure creates a payment request that is cached with a digital wallet service. The digital wallet service provides a reference or link to the cached payment request. The reference or link may be automatically communicated to the user by the chat infrastructure, or the vendor may receive the reference or link to the payment request and provide it to the user, e.g., in an email, a messaging channel, a document, and so forth. A user (whether the original user or not) that opens the payment request reference via the digital wallet service (or an associated app) receives the cached content associated with the payment request from the digital wallet service. When the user initiates updates to the payment request, e.g., changes to shipping address or shipping options, the changes are sent directly to the vendor via the digital wallet service. The vendor may then communicate an updated (or the same) payment amount or other information to the digital wallet to update the payment request. The digital wallet presents the updated payment request information to the user, and once the user confirms the payment, generates a payment token based on the payment amount associated with the transaction, and the payment token is communicated from the digital wallet service to the vendor. The digital wallet service then communicates to the user a status of the transaction as received from the vendor.

It should be understood that the figures and embodiments described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each block of the methods discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Turning now to FIG. 1, a diagram is provided which illustrates an example messaging session for utilizing a service-hosted payment request to complete an online transaction, and is generally referred to as messaging session 100. Messaging session 100 is but one example of a suitable messaging session and is not intended to suggest any limitation as to the scope of use or functionality of the technology described herein. Neither should messaging session 100 be interpreted as having any dependency or requirement relating to any one or combination of components illustrated.

As depicted in FIG. 1, messaging session 100 is represented as a Skype™ instant messaging (IM) session presented on a user device. However, messaging session 100 may also take the form of other types of messaging sessions such as WhatsApp™ and Snapchat™, among others. Messaging technologies which may be used include Internet Relay Chat (IRC) and Short Message Service (SMS), among others. The messaging client merely provides a suitable communication channel between a vendor and a user, and thus any of multiple types of messaging technologies may be utilized.

Messaging session 100 depicts a messaging session between a user and an online vendor, more specifically a chatbot associated with the online vendor. A remote-party identifier 110 identifies the vendor (i.e., the chatbot) as "Fashionwear." Also depicted is a text entry field 112, into which the user may type a message to the chatbot. Messaging session 100 also includes a message display region 114 in which messages sent by the user and messages received from the vendor are displayed. As depicted, a user message 116 has been sent by the user, requesting information about t-shirts. In response, vendor messages 118 and 120 have been received from the vendor. Vendor message 118 is a welcoming message. However, message 120 is more specifically a payment card 120 for a product (a particular t-shirt). Payment card 120 is configured to enable the user to access a payment request that was generated for the vendor by a digital wallet (not shown), as described above. Some messaging clients may simply present a reference, such as a simple hyperlink, to provide access to a payment request. Messaging clients which provide a rich environment, such as the Skype™ messaging client, may provide a more engaging version of the reference, such as payment card 120.

When the user clicks the buy button 122 on payment card 120, a request is sent to the digital wallet to access the payment request.

Figure 2:
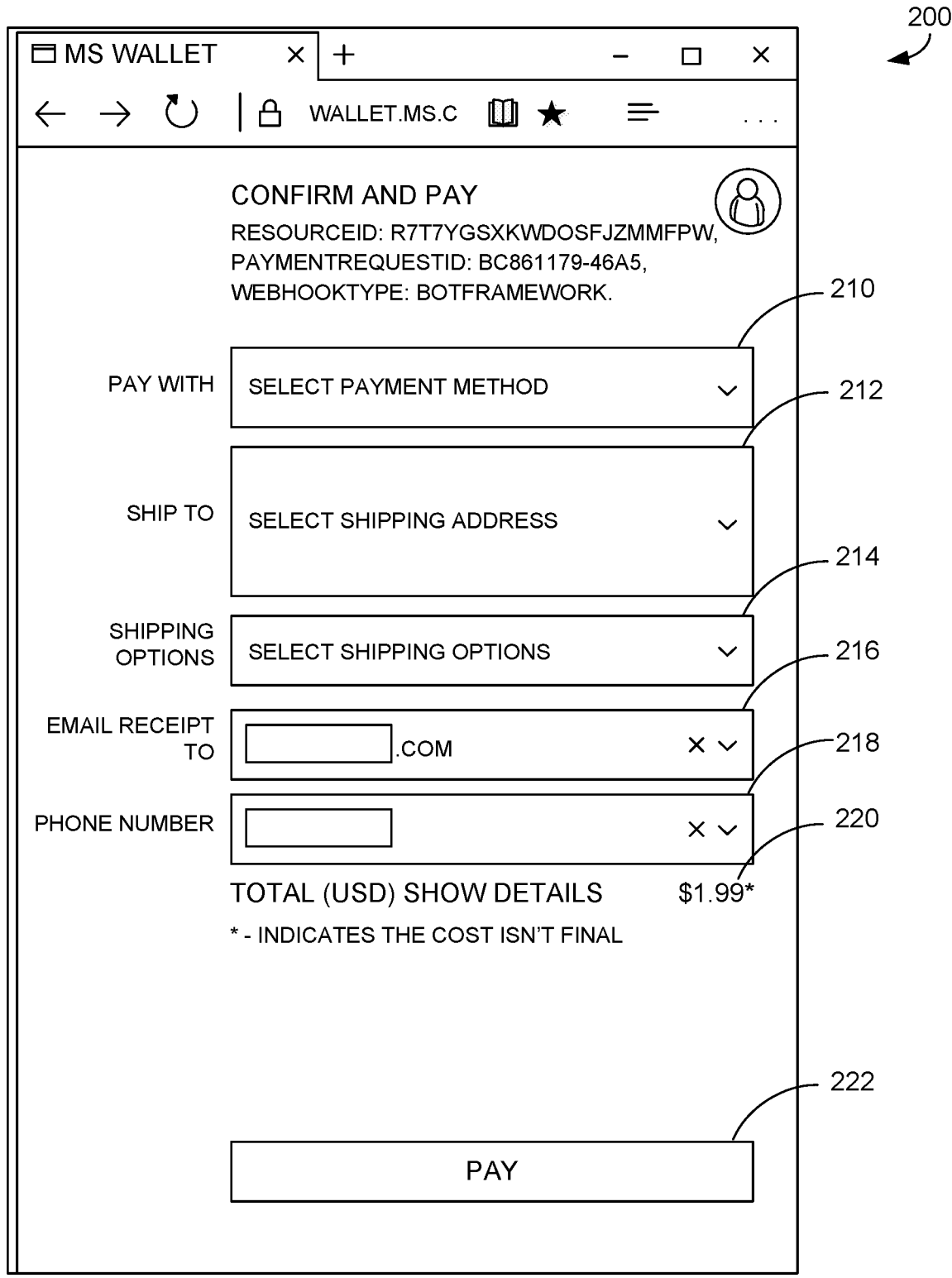
FIGS. 2-7 are diagrams illustrating example digital wallet interfaces for utilizing a service-hosted payment request to complete an online transaction, and are suitable for implementing some aspects of the invention.

Referring now to FIG. 2, a diagram is provided illustrating one example digital wallet interface for utilizing a service-hosted payment request to complete an online transaction, and is generally referred to as digital wallet interface 200. Digital wallet interface 200 is but one example of a suitable digital wallet interface and is not intended to suggest any limitation as to the scope of use or functionality of the technology described herein. Neither should digital wallet interface 200 be interpreted as having any dependency or requirement relating to any one or combination of components illustrated.

Digital wallet interface 200 is an example of how access to a payment request may be provided when the user selects buy button 122 in messaging session 100 of FIG. 1. As depicted, digital wallet interface 200 is presented in a browser window which is separate from messaging session 100. In some embodiments, digital wallet interface 200 is presented within a digital wallet app which automatically opens on the user device. In an embodiment that utilizes a rich messaging client (e.g., Skype™ chat), the rich messaging client may present digital wallet interface 200 within the messaging client interface, such as by utilizing an iframe. Digital wallet interface 200 includes a payment method field 210, a shipping address field 212, a shipping options field 214, an email field 216, a phone number field 218, a payment amount field 220, and a pay button 222. In some embodiments, digital wallet interface does not include all of these items. In other embodiments, digital wallet interface includes additional or different items. The details of digital wallet interface 200 may depend upon the nature of the product or transaction. For example, if a payment request is associated with payment of a utility bill, then payment method field 210 may be utilized, but there may be no need for shipping address field 212 or shipping options field 214. As depicted in digital wallet interface 200, no selections have been made by the user, nor have any of the selectable fields been filled by the digital wallet. Payment amount 220 thus reflects only the price of the t-shirt depicted in messaging session 100 of FIG. 1.

Figure 3:
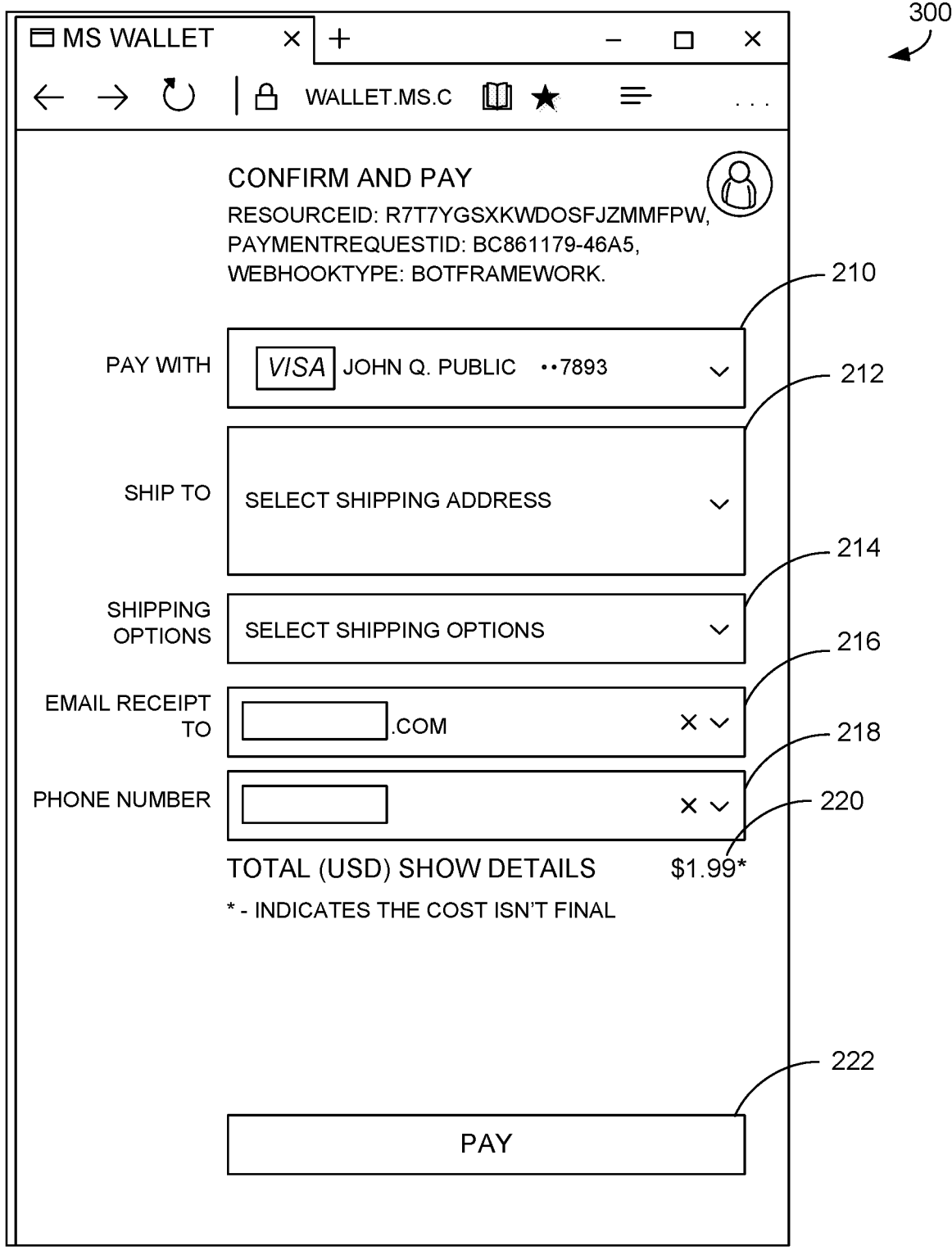

Referring now to FIG. 3, a diagram is provided illustrating one example digital wallet interface for utilizing a service-hosted payment request to complete an online transaction, and is generally referred to as digital wallet interface 300. Digital wallet interface 300 is but one example of a suitable digital wallet interface and is not intended to suggest any limitation as to the scope of use or functionality of the technology described herein. Neither should digital wallet interface 300 be interpreted as having any dependency or requirement relating to any one or combination of components illustrated.

Digital wallet interface 300 depicts the appearance of digital wallet 200 upon selection of a payment method in payment method field 210 by the user. Payment method field 210 may be a dropdown list of one or more payment methods which have previously been stored in the digital wallet service by the user, or other type of interface object which enables a selection or entry of a payment method. In an embodiment, if the user does not have a payment method, or payment instrument, on file with the digital wallet service, the digital wallet interface may provide the user with an opportunity to store one or more payment instruments. Types of payment instruments include credit accounts, debit accounts, bank accounts, e-checks, and so forth, which may be utilized for electronic transfer of funds. As depicted in FIG. 3, the user has selected a credit card as the payment method. After selection of a payment instrument by the user, the digital wallet service may communicate the user's selection to the vendor, and the vendor may communicate an updated payment amount to the digital wallet service. For example, there may be instances in which a vendor provides a discount or an additional service fee if a particular payment method is utilized. As depicted in FIG. 3, the payment amount 220 has not changed as a result of the selection of the payment method.

Figure 4:
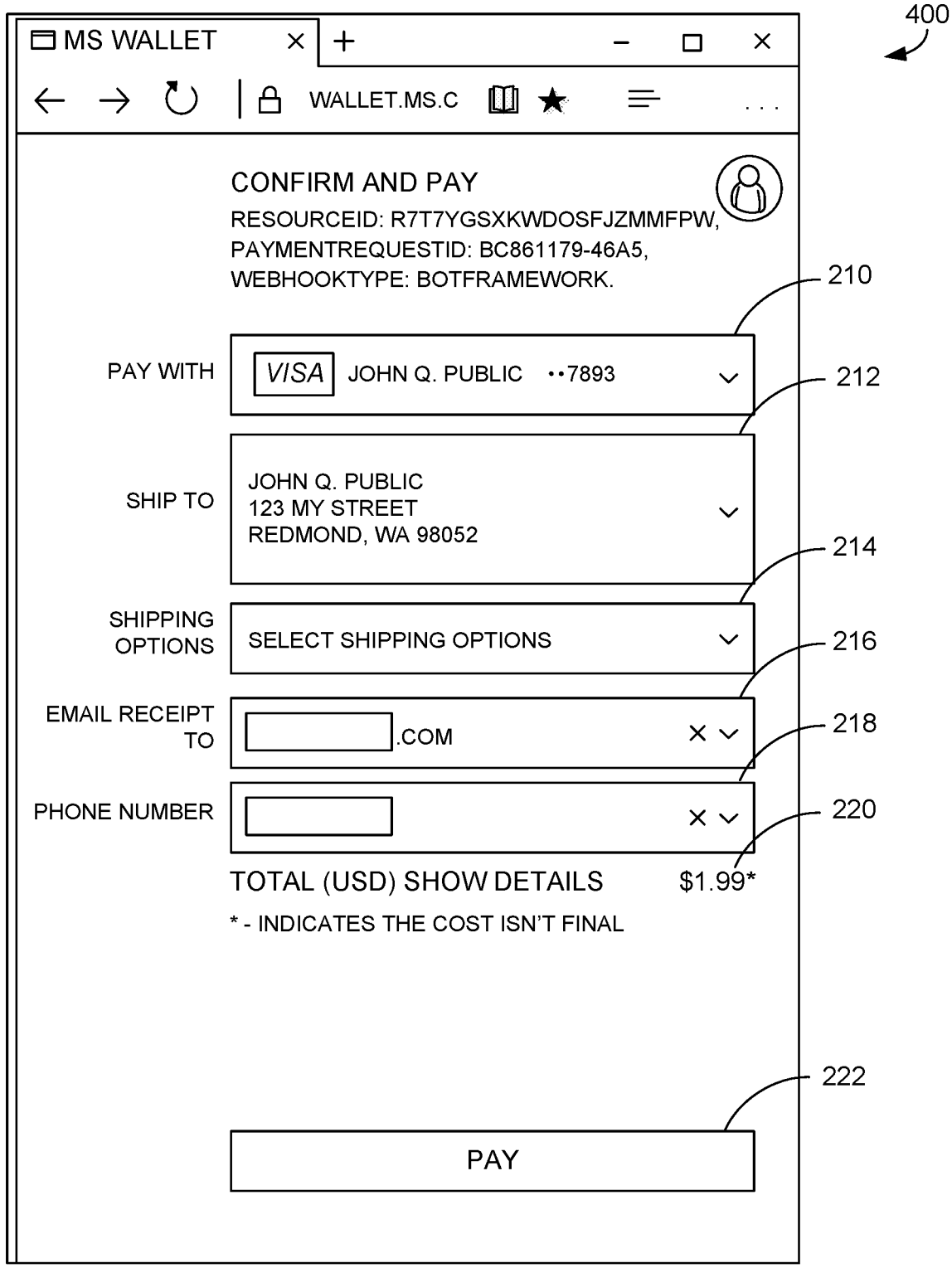

Referring now to FIG. 4, a diagram is provided illustrating one example digital wallet interface for utilizing a service-hosted payment request to complete an online transaction, and is generally referred to as digital wallet interface 400. Digital wallet interface 400 is but one example of a suitable digital wallet interface and is not intended to suggest any limitation as to the scope of use or functionality of the technology described herein. Neither should digital wallet interface 400 be interpreted as having any dependency or requirement relating to any one or combination of components illustrated.

Digital wallet interface 400 depicts the appearance of digital wallet 300 upon selection of a shipping address in shipping address field 212 by the user. Shipping address field 212 may be a dropdown list of one or more shipping addresses which have previously been stored in the digital wallet service by the user, or other type of interface object which enables a selection or entry of a shipping address. In an embodiment, if the user does not have a shipping address on file with the digital wallet service, the digital wallet interface may provide the user with an opportunity to store one or more shipping addresses. As depicted in FIG. 4, the user has selected a shipping address. After selection of a shipping address by the user, the digital wallet service may communicate the user's selection to the vendor, and the vendor may communicate an updated payment amount to the digital wallet service. For example, there may be instances in which the shipping address impacts the overall cost of the transaction. If a vendor only utilizes one type of shipping method, then the shipping cost may be determined based on the shipping address (and in some cases the weight or dimensions of the package). As another example, the price of a product or service associated with the transaction may have changed by the time the user attempts to complete the transaction. Enabling the vendor to change the payment amount and the various costs associated with the shipping address, shipping options, and so forth, is an improvement over the conventional method of utilizing a funds-transfer application, such as PayPal™, when conducting an online transaction through a chat channel or instant messaging channel (or other channels which do not enable a vendor to interact with a digital wallet application running on the user's device). As described above, a conventional funds-transfer type transaction is static, i.e., it does not permit dynamic updating of a payment amount by the vendor.

As depicted in FIG. 4, no shipping option has yet been selected, either by the user or the vendor, and the payment amount 220 has not changed as a result of the selection of the shipping address. In an embodiment, once the vendor receives the shipping address from the digital wallet service, the vendor has the option of providing a default shipping option to populate the shipping options field 214, and also providing any impacted costs (e.g., shipping cost, potential tax, total payment amount, and so forth).

Figure 5:
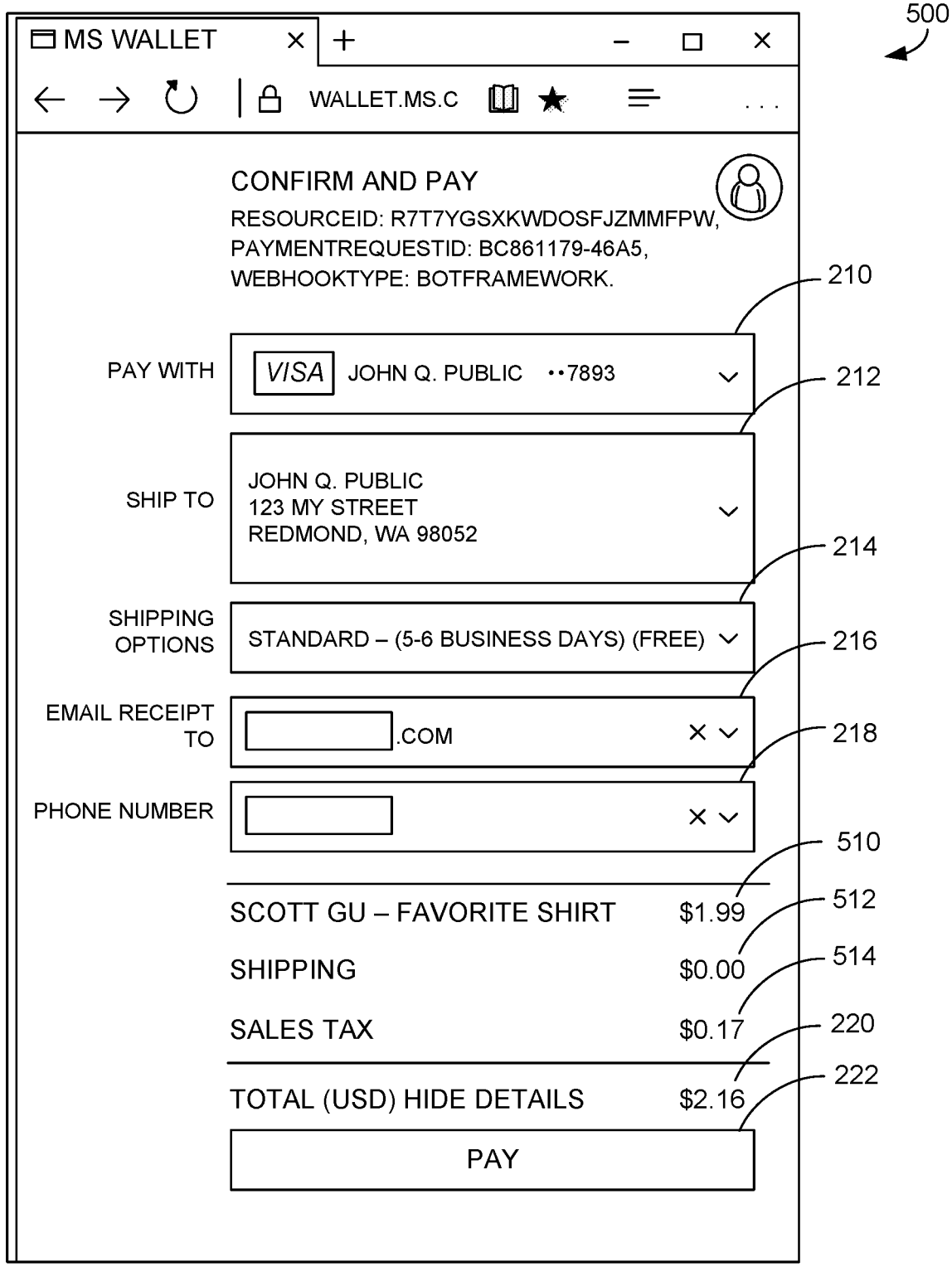

Referring now to FIG. 5, a diagram is provided illustrating one example digital wallet interface for utilizing a service-hosted payment request to complete an online transaction, and is generally referred to as digital wallet interface 500. Digital wallet interface 500 is but one example of a suitable digital wallet interface and is not intended to suggest any limitation as to the scope of use or functionality of the technology described herein. Neither should digital wallet interface 500 be interpreted as having any dependency or requirement relating to any one or combination of components illustrated.

Digital wallet interface 500 depicts the appearance of digital wallet 400 upon selection of a shipping option in shipping option field 214 by the user. Shipping option field 214 may be a dropdown list of one or more shipping options which have been communicated to the digital wallet service by the vendor. After selection of a shipping option by the user, the digital wallet service may communicate the user's selection to the vendor, and the vendor may communicate an updated payment amount and/or additional information to the digital wallet service. For example, different shipping options, such as different carriers, different delivery times, adding insurance, and so forth, may impact the overall cost of the transaction. As depicted in FIG. 5, the user has selected a "standard" shipping option that incurs no cost. As described above, enabling the vendor to change the payment amount and the various costs associated with the shipping address, shipping options, and so forth, is an improvement over the conventional method of utilizing a funds-transfer application, such as PayPal™, when conducting an online transaction through a chat channel or instant messaging channel (or other channels which do not enable a vendor to interact with a digital wallet application running on the user's device).

In addition to the items depicted in FIGS. 1-4, digital wallet interface 500 includes fields depicting additional information received by the digital wallet service from the vendor. Depicted are a product field 510, which identifies the item being purchased, a shipping cost field 512, which indicates that there is no cost for the selected shipping option, and a sales tax field 514, which indicates the amount of sales tax due based on the product and shipping costs. As depicted, the payment amount field has been updated by the vendor to reflect the amount of sales tax applied to the purchase.

Figure 6:
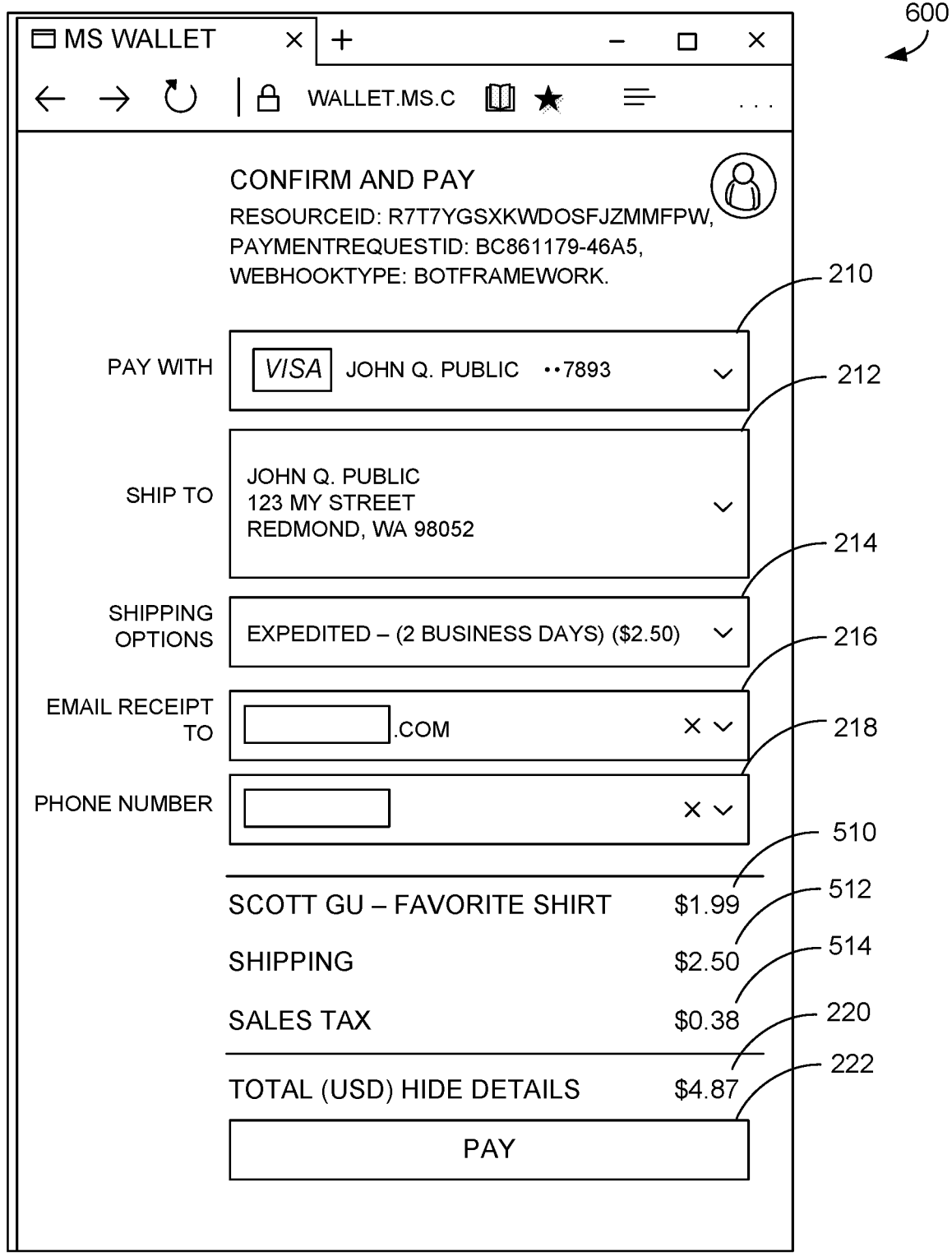

Referring now to FIG. 6, a diagram is provided illustrating one example digital wallet interface for utilizing a service-hosted payment request to complete an online transaction, and is generally referred to as digital wallet interface 600. Digital wallet interface 600 is but one example of a suitable digital wallet interface and is not intended to suggest any limitation as to the scope of use or functionality of the technology described herein. Neither should digital wallet interface 600 be interpreted as having any dependency or requirement relating to any one or combination of components illustrated.

Digital wallet interface 600 depicts the appearance of digital wallet 500 upon selection of a different shipping option in shipping option field 214 by the user. Shipping option field 214 may be a dropdown list of one or more shipping options which have been communicated to the digital wallet service by the vendor. After selection of the different shipping option by the user, the digital wallet service may communicate the user's selection to the vendor, and the vendor may communicate an updated payment amount and/or additional information to the digital wallet service. For example, different shipping options, such as different carriers, different delivery times, adding insurance, and so forth, may impact the overall cost of the transaction. As depicted in FIG. 6, the user has selected an "expedited" shipping option that incurs an additional cost. Shipping cost field 512 reflects the updated shipping cost received by the digital wallet service from the vendor, sales tax field 514 reflects the updated amount of sales tax due based on the product cost and the updated shipping cost received from the vendor, and the payment amount field 220 reflects the updated payment amount, as received from the vendor, based on the updated shipping and sales tax amounts.

Figure 7:

Referring now to FIG. 7, a diagram is provided illustrating one example digital wallet interface for utilizing a service-hosted payment request to complete an online transaction, and is generally referred to as digital wallet interface 700. Digital wallet interface 700 is but one example of a suitable digital wallet interface and is not intended to suggest any limitation as to the scope of use or functionality of the technology described herein. Neither should digital wallet interface 700 be interpreted as having any dependency or requirement relating to any one or combination of components illustrated.

Digital wallet interface 700 depicts the appearance of digital wallet interface 600 upon selection of the pay button 222 shown in FIG. 6. Digital wallet interface 700 includes a completion indication 710, which notifies the user that the transaction has been completed, and a continue shopping button 712, which may close digital wallet interface 700 and allow the user to continue shopping in messaging session 100 via the chatbot. Although not depicted in FIG. 7, when the digital wallet service receives an indication that the user selected the pay button 222, the digital wallet service generates a payment token and communicates the token to the vendor. The vendor processes the transaction based on the details of the transaction and the payment token, and the transaction is considered complete when the vendor responds to the digital wallet service with an indication that the transaction status is "success." Alternatively, the indicated status may be "unknown" or "failure." The unknown state is used primarily for a purchase of physical goods in which the user is not charged for the payment until the goods are ready to be shipped. A transaction may fail for a number of reasons. For example, a product associated with the transaction may be out of stock by the time the user checks out, the user's credit card may be declined, and so forth. In an embodiment, in the event that the status is "unknown" or "failure," then the completion indication 710 may indicate to the user that the transaction is pending (e.g., pending shipping of an item) or did not complete, respectively. In the event of a successful completion, the vendor may send a receipt to the user via the chat window or via email.

Figure 8:
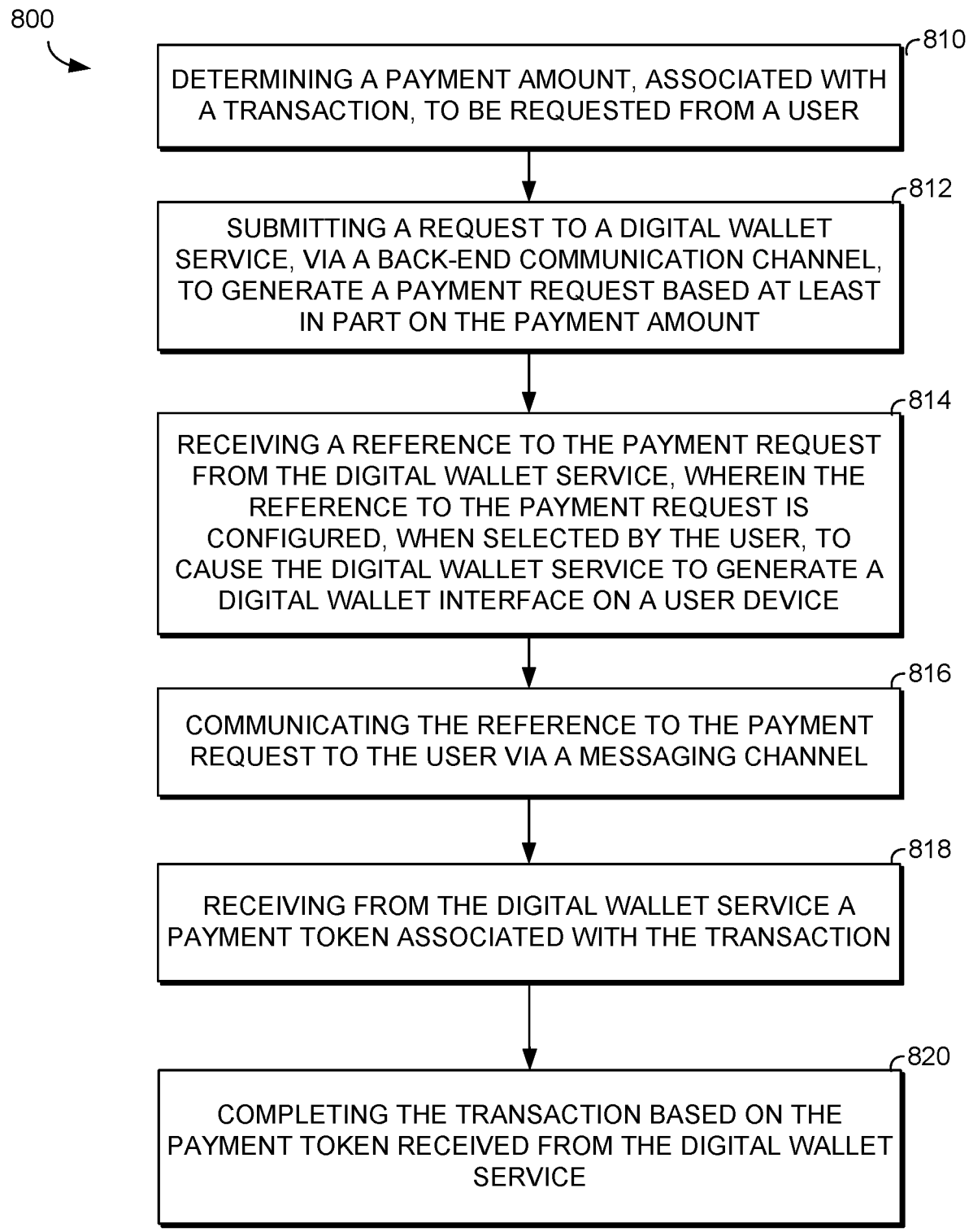
FIGS. 8-10 are flow diagrams illustrating example methods of utilizing a service-hosted payment request for completing an online transaction, and are suitable for implementing some aspects of the invention.

Turning now to FIG. 8, a flow diagram is provided illustrating one example method 800 of utilizing a service-hosted payment request for completing an online transaction. Method 800 is but one example of a suitable method and is not intended to suggest any limitation as to the scope of use or functionality of the technology described herein. Neither should method 800 be interpreted as having any dependency or requirement relating to any one or combination of components illustrated. In an embodiment, method 800 is utilized by an online vendor to engage in an online transaction with a user.

At step 810, a payment amount associated with an online transaction to be requested from a user is determined by a vendor. In an embodiment, the payment amount is determined by a web agent, which may be a bot, associated with the vendor. In another embodiment, the payment amount is determined by the vendor's back end, such as by one or more servers, which may communicate the payment amount to the bot. In an embodiment, the determination of the payment amount may be based at least in part on line item costs associated with options such as a payment method and shipping options, among others.

At step 812, a request is submitted to a digital wallet service, via a back-end communication channel, to generate a payment request based at least in part on the payment amount and/or other details about the transaction that are known to the vendor. In an embodiment, the request is submitted utilizing one or more payment request API calls. The request to create the payment request may contain information such as a payment amount, shipping options offered by the vendor, and/or other details about the transaction provided by the vendor. The request to create the payment request may also contain an expiration period or an expiration date and time. In an embodiment, the digital wallet service generates the payment request and caches it for a period of time, such as a number of minutes, hours, or days, or until a particular date and time, depending on what the vendor has specified in the request to create the payment request. Upon expiration of the specified time period, the payment request is no longer valid.

At step 814, a reference, or link, to the payment request is received by the vendor from the digital wallet service via a backend communication channel. In an embodiment, the reference or link identifies the payment request (which is stored and maintained by the digital wallet service) and is configured, when selected by a user, to request access to the payment request. In response, the digital wallet service generates a digital wallet interface which includes details of the payment request for presentation on the user's client device. In one embodiment, the vendor utilizes a bot framework, such as Microsoft Bot Framework, which provides tools enabling the vendor to develop a bot which incorporates an API that provides the functionality to utilize the service-hosted payment requests. Such a bot framework may proxy communication between the vendor bot and users across many different messaging platforms. When the vendor uses such a bot framework to connect to a messaging channel, such as a chat channel, the bot framework intercepts the bot's request to create a payment request, and provides it to the digital wallet service which creates the payment request and, because the bot framework proxies communication between the vendor bot and the user, the digital wallet service returns the reference or link to the payment request to the user via the messaging channel. Thus in this embodiment, the reference or link to the payment request is not returned to the vendor.

At step 816, the vendor communicates the reference or link to the payment request to the user via a messaging channel. (However, in the embodiment described above in which the vendor utilizes the bot framework that proxies communication between the vendor and the user, the vendor does not communicate the reference or link to the payment request to the user, because that is handled by the bot framework.) The messaging channel may be provided by a third party not associated with the transaction. Examples of messaging channels include chat channels such as IRC and other types of chat channels, and short message service (SMS) channels, among others. Examples of messaging channels may also include email channels. Although communication via email may not be continuous or real-time as with a chat session, the term channel as used herein encompasses email communication. An embodiment of the invention does not require a user to interact with a digital wallet service and complete a transaction during the same session in which the transaction was initiated. The user may opt to select the reference or link to the payment request at a later time; thus, a reference or link to a payment request sent to the user in an email may be accessed at the user's convenience.

In an embodiment, subsequent to communicating the reference or link to the payment request to the user, an indication of user-provided information pertaining to the transaction is received from the digital wallet service. This may occur, for example, after the user has selected the reference or link to the payment request to access the digital wallet service, and has viewed the details of the payment request in the digital wallet interface. The digital wallet interface may present various options to the user, such as selections of payment instrument, a shipping address, or a shipping method, as described above with regard to FIGS. 2-6. Upon receiving new or changed selections from the user, the digital wallet service may communicate the selections to the vendor. Upon receiving the user-provided information from the digital wallet service, the vendor may then update the payment amount based at least in part on the user selections. The vendor may then submit a request to the digital wallet service to update the payment request based on the updated payment amount. In the event that no updates are required, the vendor may simply respond with the same details received from the digital wallet service.

At step 818, a payment token associated with the transaction is received by the vendor from the digital wallet service. In an embodiment, receiving the payment token from the digital wallet service indicates that the digital wallet service received confirmation from the user to proceed with completing the transaction. The token may be a secure payment token which conveys information (e.g., an account number) for the selected payment instrument to the vendor. The token may be linked to a security key associated with the vendor such that, even if intercepted by another party, the payment token can be utilized only by the vendor. An example of a payment token which can be utilized only by the vendor would be a processor token, such as a Stripe™ token, where the token is bound to the vendor (e.g., the vendor has a secret key that associates the token with the vendor) and is valid for a one-time-use only by that vendor. At step 820, the vendor completes the transaction based on the payment token received from the digital wallet service. Completing the transaction may include verification of the validity of the payment instrument (or a transfer of funds) for the transaction, and providing an order fulfillment service with payment confirmation, an identification of the product (or service) to be provided, shipping address, shipping options, and so forth. Upon successful completion of the transaction, the vendor may respond to the digital wallet service with an indication that the transaction completed successfully. The vendor may also communicate a receipt to the user.

Figure 9:
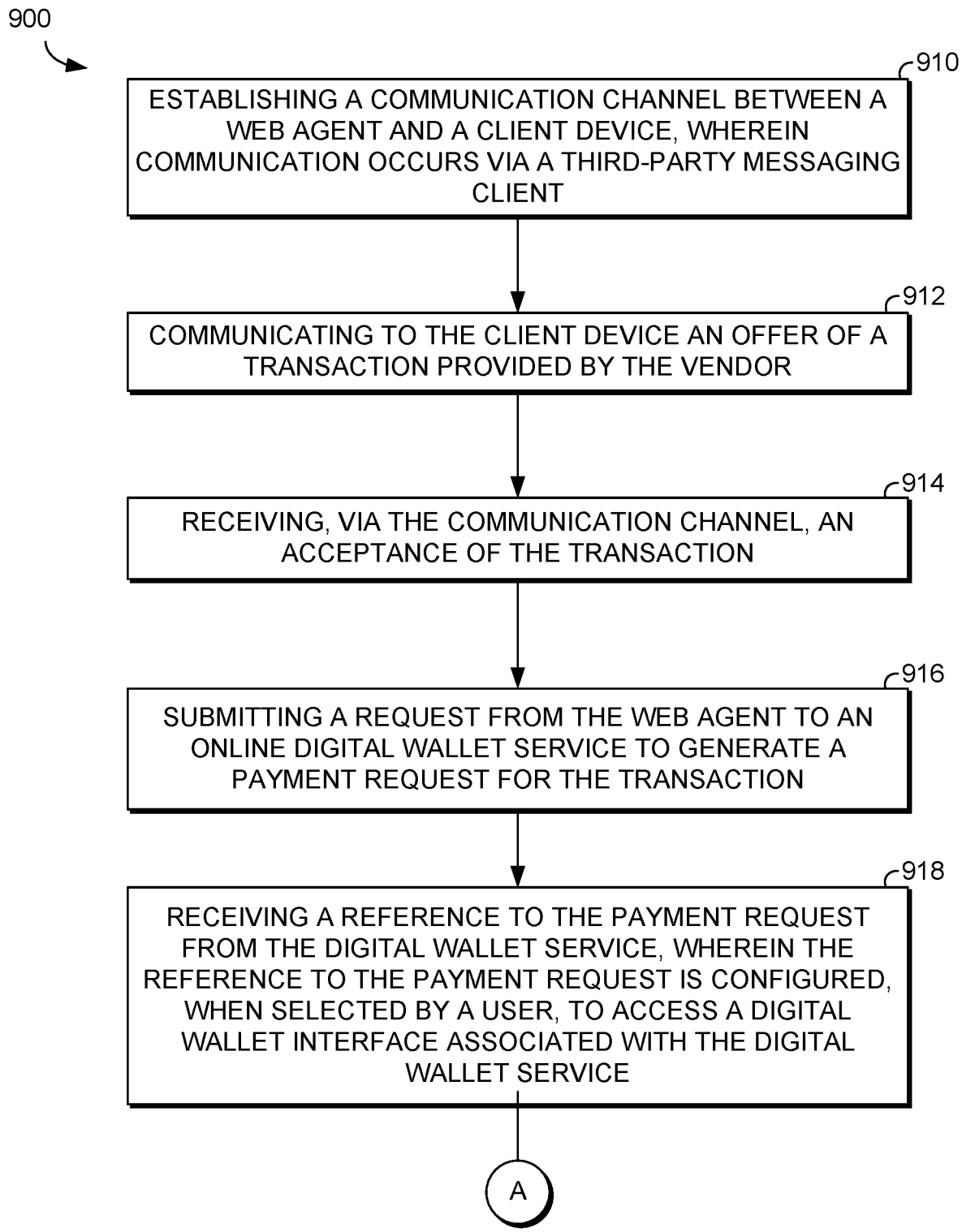
Figure 9:
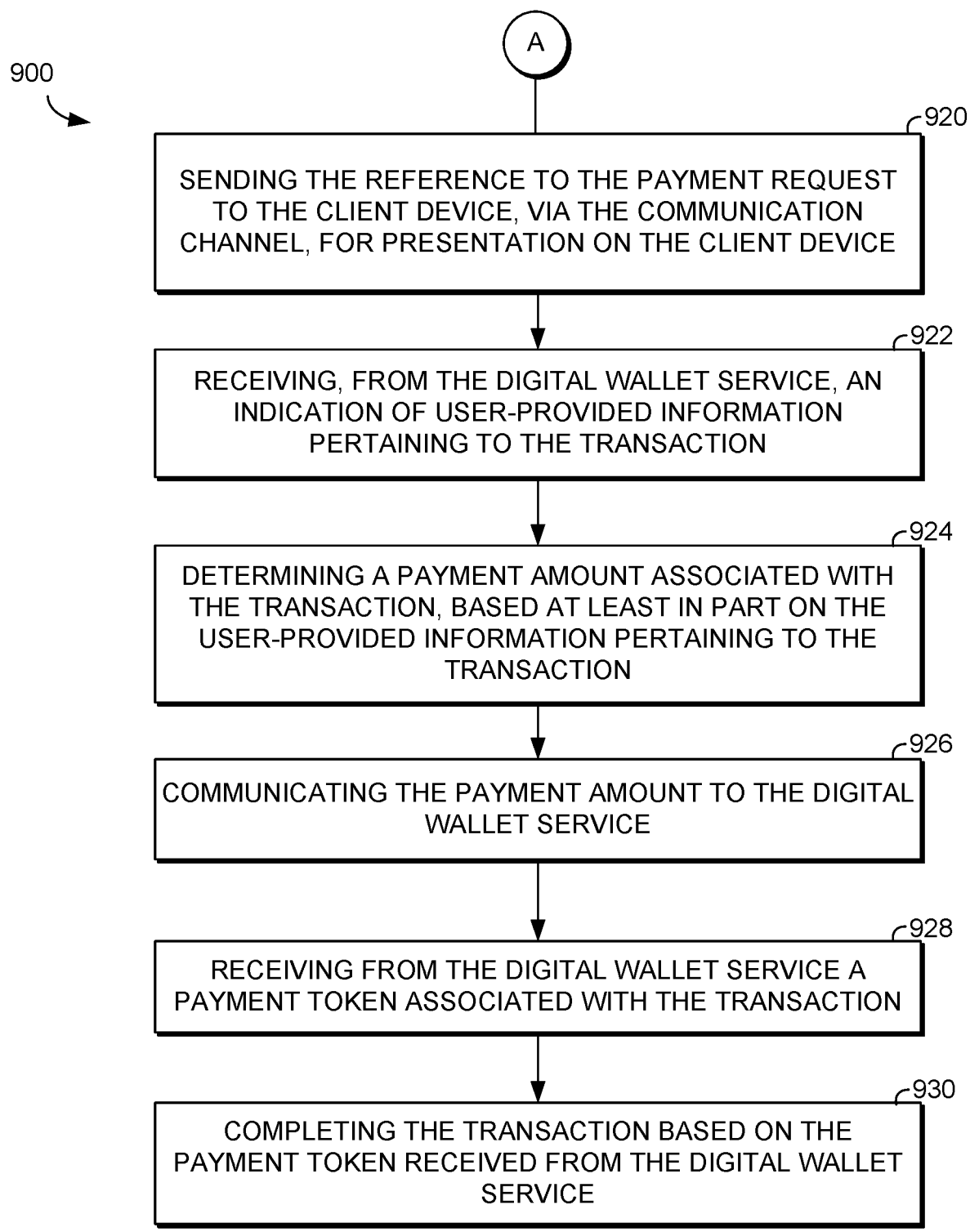

Turning now to FIG. 9, a flow diagram is provided illustrating one example method 900 of utilizing a service-hosted payment request for completing an online transaction. Method 900 is but one example of a suitable method and is not intended to suggest any limitation as to the scope of use or functionality of the technology described herein. Neither should method 900 be interpreted as having any dependency or requirement relating to any one or combination of components illustrated. In an embodiment, method 900 is utilized by an online vendor to engage in an online transaction with a user.

At step 910, a communication channel is established between a web agent and a client device. The web agent may be an intelligent agent, such as a bot or a chatbot. A chatbot typically has the ability to converse with a user using natural language, such that the user can type or otherwise enter questions and requests that may be addressed or fulfilled by the chatbot with natural language responses. A user may communicate with a chatbot by typing text into a field, and receiving the chatbot's replies in the form of textual responses. However, other forms of input and output, such as speech, may also be utilized. A bot may not have the degree of natural language understanding that is usually associated with a chatbot, and may instead provide the user with menu selections or other selectable options for conducting a transaction. The bot's replies to the user may be in the form of pre-determined textual or spoken language responses.

Communication through the communication channel may occur via a third-party messaging client. In an embodiment, the third-party messaging client is a chat client or an instant messaging (IM) client. In another embodiment, the third-party messaging client is a short message service (SMS) client. The third-party messaging client is unaware of any details regarding the transaction, and merely provides a conduit for communication. Additionally, the third-party messaging client does not provide a mechanism for the vendor to communicate with an app (such as a digital wallet) running locally on the user's client device.

At step 912, an offer of a transaction provided by the vendor is communicated to the client device. For example, the vendor may provide an offer to purchase a product or a service. In an embodiment, the vendor provides an offer for the user to pay an existing invoice, such as for a utility bill or a prior purchase. The offer may include a means (such as a user-selectable element, e.g., a button, icon, hyperlink, and so forth) that enables the user to initially accept the offer and proceed with the process of completing the transaction.

At step 914, an initial acceptance of the transaction is received via the communication channel. At this point, the vendor may have little or no information about the user, other than what is provided by the messaging client. However, an embodiment enables the vendor to obtain a payment request object which can be utilized by the user either immediately, or at a later point in time, to complete the transaction.

At step 916, a request is submitted from the web agent or vendor to an online digital wallet service to generate a payment request for the transaction. In an embodiment, the request is submitted by utilizing one or more API calls to request generation of a payment request object. The payment request object, which may contain information such as an initial payment amount, shipping options offered by the vendor, and other details about the transaction that are known to the vendor, is cached by the digital wallet service. In an embodiment, communication between the web agent and the digital wallet service occurs via a back-end communication channel.

At step 918, a reference, or link, to the cached payment request is received from the digital wallet service. In an embodiment, the reference or link to the payment request is received via the back-end communication channel. The reference or link to the payment request is configured, when selected by a user, to access a digital wallet interface associated with the digital wallet service.

At step 920, the reference or link to the payment request is sent to the client device, via the communication channel, for presentation on the client device. In an embodiment, the reference or link to the payment request received from the digital wallet service is not specific to the user currently engaged in the communication with the vendor. Thus, the vendor could provide the reference or link to the payment request to multiple users. For example, the user may communicate with the vendor from within a chat room, in which messages may be seen by other participants in the chat room. If the vendor communicates the reference or link to the payment request to the user in the chat room, each chat room participant that sees the reference or link to the payment request views it on his or her own client device. Accordingly, each participant may individually select the reference or link on his or her client device and separately interact with the digital wallet service and utilize the cached payment request to complete the transaction that is associated with the payment request, e.g., purchase a product or service associated with the vendor's initial request for the payment request. As another example, a vendor could provide a reference or link to a payment request in a tweet which is viewable by many users. Any user that views the tweet may individually select the reference or link on his or her client device and separately interact with the digital wallet service, prompting the digital wallet service to provide the user's information to the vendor for conducting the transaction for that user. Additionally, a vendor could provide a reference or link to a payment request in a document that is accessible to one or more users. Again, any user that views the document, either immediately or at a later point in time (but prior to expiration of the payment request) may individually select the reference or link on his or her client device and separately interact with the digital wallet service to conduct the transaction.

At step 922, an indication of user-provided information pertaining to the transaction is received from the digital wallet service. The user-provided information may include a shipping address and/or a selected shipping method. This may occur, for example, after the user has accessed the digital wallet service and viewed the payment request. The digital wallet interface may present various options to the user, such as selections of payment instrument, a shipping address, or a shipping method, as described above with regard to FIGS. 2-6. Upon receiving new or changed selections from the user, the digital wallet service may communicate the user-provided information to the vendor.

At step 924, a payment amount associated with the transaction is determined, based at least in part on the user-provided information pertaining to the transaction. If an initial payment amount was provided to the digital wallet service, then the determined payment amount may be an updated payment amount based at least in part on the user-provided information.

At step 926, the payment amount is communicated to the digital wallet service to request an update of the payment request based on the updated payment amount. The request may be submitted by utilizing one or more payment request API calls.

At step 928, a payment token associated with the transaction is received from the digital wallet service. In an embodiment, receiving the payment token from the digital wallet service indicates that the digital wallet service received confirmation from the user to proceed with completing the transaction. The token may be a secure payment token which conveys information (e.g., an account number) for the selected payment instrument to the vendor. The token may be linked to a security key associated with the vendor such that, even if intercepted by another party, the payment token can be utilized only by the vendor.

At step 930, the vendor completes the transaction based on the payment token received from the digital wallet service. Completing the transaction may include verification of the validity of the payment instrument (or a transfer of funds) for the transaction, and providing an order fulfillment service with payment confirmation, an identification of the product (or service) to be provided, shipping address, shipping options, and so forth. Upon successful completion of the transaction, the vendor may respond to the digital wallet service with an indication that the transaction completed successfully. The vendor may also communicate a receipt to the user.

Figure 10:
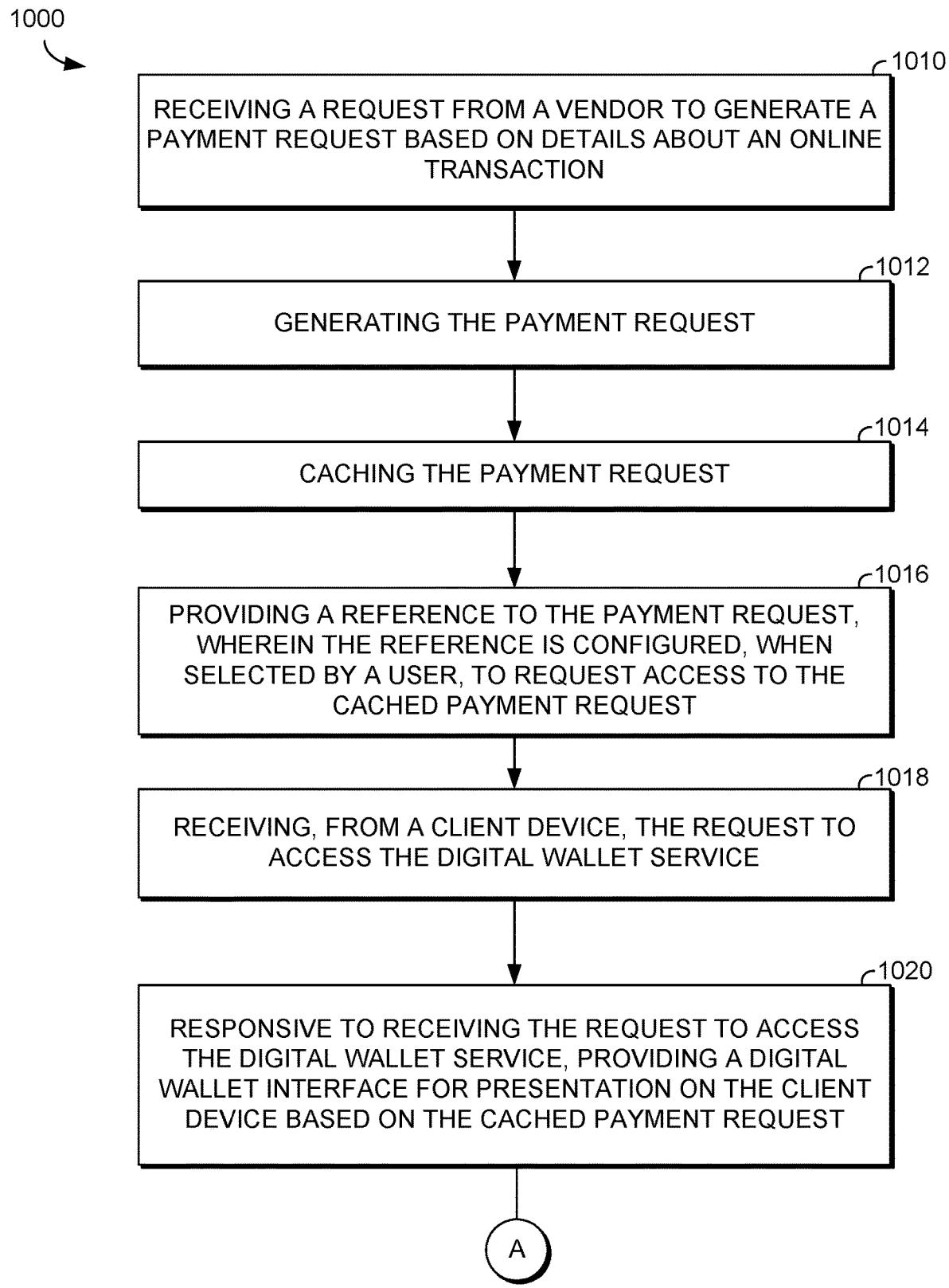

Turning now to FIG. 10, a flow diagram is provided illustrating one example method 1000 of causing a digital wallet service to provide a service-hosted payment request for completing an online transaction. Method 1000 is but one example of a suitable method and is not intended to suggest any limitation as to the scope of use or functionality of the technology described herein. Neither should method 1000 be interpreted as having any dependency or requirement relating to any one or combination of components illustrated. In an embodiment, method 1000 is utilized by an online vendor to engage in an online transaction with a user.

At step 1010, a request is received by the digital wallet service from a vendor to generate a payment request based on details about an online transaction. In an embodiment, communication between the digital wallet service and the vendor comprises communication with an intelligent agent, such as a bot or a chatbot associated with the vendor; however, the communication between the digital wallet service and the vendor occurs via a back-end communication channel and not on a user client device. The request to generate the payment request may include details about a product or service associated with the transaction, and an initial payment amount associated with the transaction.

At step 1012, the payment request is generated. In an embodiment, the payment request does not include a shipping address or identification of a payment instrument, but may include details about the product or service and the initial payment amount associated with the transaction. The digital wallet service, however, does not utilize the details or payment amount other than to provide them in the payment request.

At step 1014, the payment request is cached by the digital wallet service. In an embodiment, the payment request is cached for a period of time, such as a number of minutes, hours, or days, or until a particular date and time, depending on what the vendor has specified in the request to create the payment request. In one embodiment, the payment request is cached for a specified amount of time from five minutes to thirty days. Upon expiration of the specified time period, the payment request is no longer valid.

At step 1016, a reference, or link, to the payment request is provided by the digital wallet service. The reference or link identifies the cached payment request and is configured, when selected by a user, to request access to the cached payment request. In an embodiment, the reference or link to the payment request is provided by communicating it directly to the user via a messaging session proxied by the digital wallet service between the vendor and the user. In one embodiment, the reference or link to the payment request is provided by communicating it directly to the vendor. The vendor may then provide the reference or link to the user, e.g., in an email, a messaging channel, a document, and so forth.

At step 1018, the request to access the cached payment request is received by the digital wallet service from a client device. Receiving the request signifies that a user selected the reference or link on the client device from which the request was received. At step 1020, responsive to receiving the request to access the digital wallet service, a digital wallet interface is provided for presentation on the client device based on the cached payment request. In an embodiment, the digital wallet interface is presented in the form of a web page communicated to a web browser on the client device.

At step 1022, user-provided information pertaining to the transaction is communicated to the vendor. In an embodiment, the user-provided information pertaining to the transaction includes identification of a payment instrument, a shipping address and/or a selected shipping method. This may occur, for example, in response to selections of options made by the user within the digital wallet interface. The digital wallet interface may present various options to the user, as described above with regard to FIGS. 2-6.

At step 1024, a payment amount associated with the transaction is received from the vendor. In an embodiment, the payment amount is an updated payment amount based on the user-provided information which was communicated from the digital wallet service to the vendor. At step 1026, the payment amount is communicated for presentation on the digital wallet interface on the client device.

At step 1028, an indication to complete the transaction is received from the client device. For example, after viewing the selected options and the payment amount, the user may have selected a button or icon indicating that the transaction should proceed to be completed. At step 1030, a payment token is generated based on the payment amount associated with the transaction. The token may be a secure payment token which conveys information (e.g., an account number) for the selected payment instrument to the vendor. The token may be linked to a security key associated with the vendor such that, even if intercepted by another party, the payment token can be utilized only by the vendor.

At step 1032, the payment token is communicated from the digital wallet service to the vendor. In an embodiment, once the vendor has processed and completed the transaction based on the payment token, the digital wallet service receives an indication from the vendor that the transaction is complete. The digital wallet service may then present on the digital wallet interface a notification to the user that the transaction has been completed.

Figure 11:
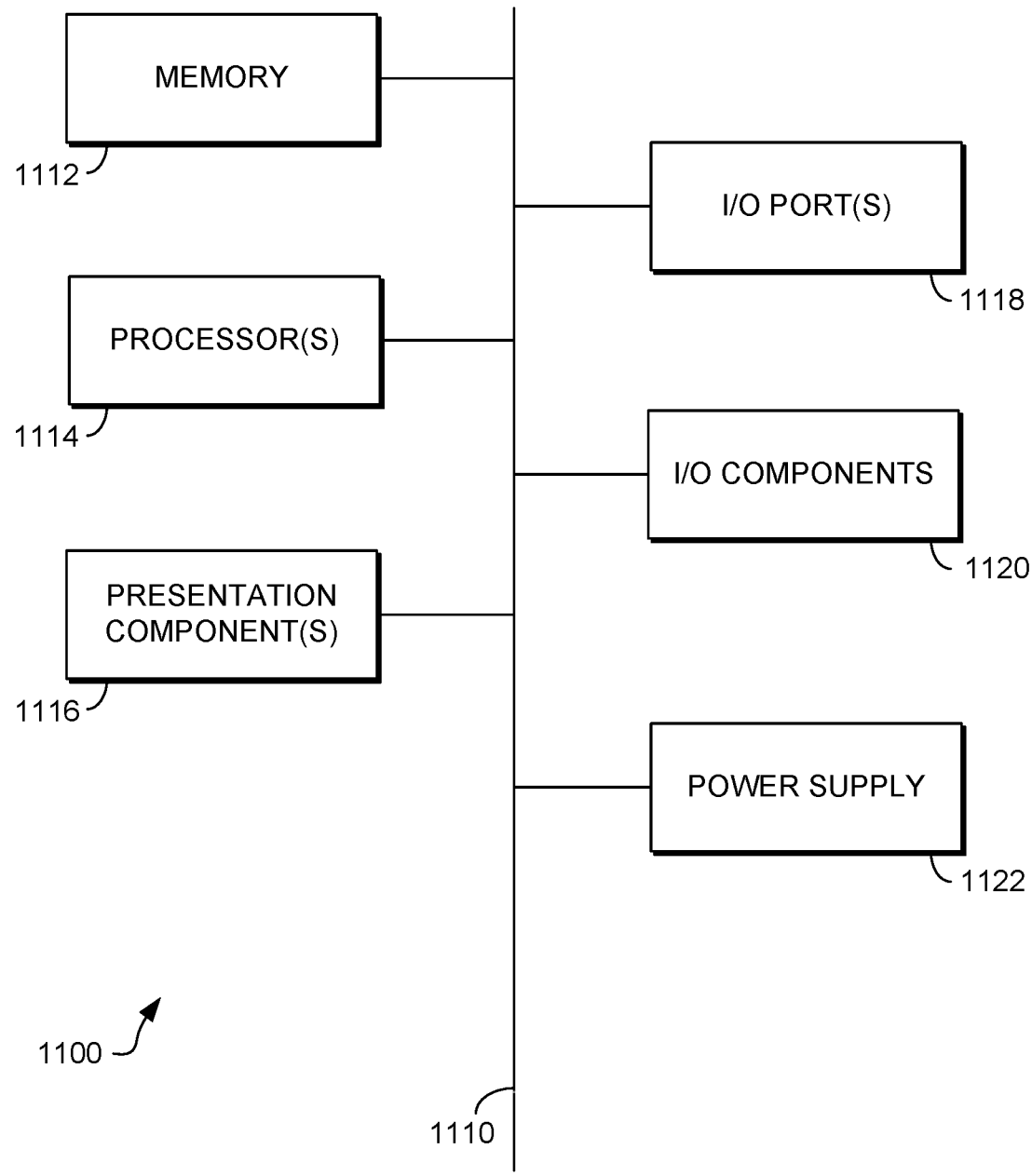
FIG. 11 is a block diagram of an exemplary computing environment suitable for use in implementing some aspects of the technology described herein.

Having described some aspects of the technology presented herein, an exemplary operating environment in which aspects of the technology presented herein may be implemented is described below in order to provide a general context for various aspects of the technology presented herein. Referring to FIG. 11 in particular, an exemplary operating environment for implementing aspects of the technology presented herein is shown and designated generally as computing device 1100. Computing device 1100 is but one example of a suitable computing environment and is not intended to suggest any limitation as to the scope of use or functionality of aspects of the technology described herein. Neither should the computing device 1100 be interpreted as having any dependency or requirement relating to any one or combination of components illustrated.

Aspects of the technology provided herein may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Aspects of the technology described herein may be practiced in a variety of system configurations, including hand-held devices, consumer electronics, general-purpose computers, more specialty computing devices, etc. Aspects of the technology described herein may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output (I/O) ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 11 is merely illustrative of an exemplary computing device that can be used in connection with one or more aspects of the technology described herein. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 400. The computing device 1100 may be equipped with depth cameras, such as, stereoscopic camera systems, infrared camera systems, RGB camera systems, and combinations of these for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

The technology has been described in relation to particular aspects, which are intended in all respects to be illustrative rather than restrictive. Alternative configurations will become apparent to those of ordinary skill in the art to which the technology described herein pertains without departing from its scope.

From the foregoing, it will be seen that the technology described herein is well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Example Embodiments

Embodiment 1. A method of utilizing a service-hosted payment request to complete an online transaction, comprising: determining a payment amount, associated with a transaction, to be requested from a user; submitting a request to a digital wallet service, via a back-end communication channel, to generate a payment request based at least in part on the payment amount; receiving a reference to the payment request from the digital wallet service, wherein the reference to the payment request is configured, when selected by the user, to cause the digital wallet service to generate a digital wallet interface on a user device; communicating the reference to the payment request to the user via a messaging channel; receiving from the digital wallet service a payment token associated with the transaction; and completing the transaction based on the payment token received from the digital wallet service.

Embodiment 2. The method of embodiment 1, wherein receiving the payment token from the digital wallet service indicates that the digital wallet service received user confirmation of the transaction.

Embodiment 3. The method of embodiment 1, further comprising, prior to receiving the payment token: receiving, from the digital wallet service, an indication of user-provided information pertaining to the transaction; determining an updated payment amount based at least in part on the user-provided information pertaining to the transaction; submitting a request to the digital wallet service to update the payment request based on the updated payment amount.

Embodiment 4. The method of embodiment 1, wherein the messaging channel is provided by a third party not associated with the transaction.

Embodiment 5. The method of embodiment 1, wherein the messaging channel is one or more of a chat channel, an instant message channel, or an email channel.

Embodiment 6. The method of embodiment 5, wherein the messaging channel is an IRC chat channel.

Embodiment 7. The method of embodiment 5, wherein the messaging channel is a short message service (SMS) channel.

Embodiment 8. The method of embodiment 1, wherein one or more application programming interface (API) calls are utilized to submit the request to generate the payment request to the digital wallet service.

Embodiment 9. The method of embodiment 3, wherein the user-provided information pertaining to the transaction comprises a shipping address and/or a selected shipping method.

Embodiment 10. The method of embodiment 1, wherein the user-provided information pertaining to the transaction comprises an identification of a payment instrument.

Embodiment 11. One or more computer-readable media having embodied thereon computer-usable instructions which, when executed by one or more processors, facilitate a method of utilizing a service-hosted payment request for completing an online transaction, the method comprising: establishing a communication channel between a web agent and a client device, wherein communication occurs via a third-party messaging client; communicating to the client device an offer of a transaction provided by the vendor; receiving, via the communication channel, an acceptance of the transaction; submitting a request from the web agent to an online digital wallet service to generate a payment request for the transaction; receiving a reference to the payment request from the digital wallet service, wherein the reference to the payment request is configured, when selected by a user, to access a digital wallet interface associated with the digital wallet service; sending the reference to the payment request to the client device, via the communication channel, for presentation on the client device; receiving, from the digital wallet service, an indication of user-provided information pertaining to the transaction; determining a payment amount associated with the transaction, based at least in part on the user-provided information pertaining to the transaction; communicating the payment amount to the digital wallet service; receiving from the digital wallet service a payment token associated with the transaction; and completing the transaction based on the payment token received from the digital wallet service.

Embodiment 12. The media of embodiment 11, wherein communication between the web agent and the digital wallet service occurs via a back-end communication channel.

Embodiment 13. The media of embodiment 11, wherein the user-provided information pertaining to the transaction comprises a shipping address and/or a selected shipping method.

Embodiment 14. The media of embodiment 11, wherein the third-party messaging client is a chat client.

Embodiment 15. The media of embodiment 11, wherein the third-party messaging client is a short message service (SMS) client.

Embodiment 16. One or more computer-readable media having embodied thereon computer-usable instructions which, when executed by one or more processors, cause a digital wallet service to perform a method of providing a service-hosted payment request, the method comprising: receiving a request from a vendor to generate a payment request based on details about an online transaction; generating the payment request; caching the payment request; providing a reference to the payment request, wherein the reference is configured, when selected by a user, to request access to the cached payment request; receiving, from a client device, the request to access the cached payment request; responsive to receiving the request to access the digital wallet service, providing a digital wallet interface for presentation on the client device based on the cached payment request; communicating, to the vendor, user-provided information pertaining to the transaction; receiving, from the vendor, a payment amount associated with the transaction; communicating the payment amount for presentation on the digital wallet interface on the client device; receiving, from the client device, an indication to complete the transaction; generating a payment token based on the payment amount associated with the transaction; and communicating the payment token from the digital wallet service to the vendor.

Embodiment 17. The media of embodiment 16, wherein communication with the vendor comprises communication with a bot associated with the vendor.

Embodiment 18. The media of embodiment 17, wherein providing the reference to the payment request comprises communicating the reference to the payment request to the user via a messaging session proxied by the digital wallet service between the bot and the user.

Embodiment 19. The media of embodiment 16, wherein communication between the digital wallet service and the vendor occurs via a back-end communication channel.

Embodiment 20. The media of embodiment 16, wherein the digital wallet interface comprises a web page communicated to a web browser on the client device.

The invention claimed is:

1. A method of utilizing a service-hosted payment request to complete an online transaction between a provider and a user, comprising:
    determining a payment amount, associated with a transaction initiated within a third-party messaging channel, to be requested from a user of a client device, wherein the third-party messaging channel does not use a front-end application of the provider on the client device;
    submitting a request by the provider to an online digital wallet service, via a back-end communication channel, to generate a payment request object based at least in part on the payment amount, wherein the payment request object is cached by the digital wallet service, and wherein the payment request object contains details about the transaction provided by the vendor;
    receiving at the provider a reference to the payment request object from the digital wallet service, wherein the reference to the payment request object identifies the payment request object which is stored by the digital wallet service, wherein the reference to the payment request object is configured, when selected by the user, to cause the digital wallet service to generate a digital wallet interface on the client device, and wherein the digital wallet interface presents the details about the transaction provided by the vendor;
    communicating the reference to the payment request object to the user via the third-party messaging channel;
    receiving from the digital wallet service a payment token associated with the transaction, wherein receiving the payment token from the digital wallet service indicates that the digital wallet service received user confirmation of the transaction via the digital wallet interface on the client device; and
    completing the transaction based on the payment token received from the digital wallet service.

2. The method of claim 1, further comprising, prior to receiving the payment token:
    receiving, from the digital wallet service, an indication of user-provided information pertaining to the transaction;
    determining an updated payment amount based at least in part on the user-provided information pertaining to the transaction;
    submitting a request to the digital wallet service to update the payment request object based on the updated payment amount.

3. The method of claim 1, wherein the messaging channel is provided by a third party not associated with the transaction.

4. The method of claim 1, wherein the messaging channel is one or more of a chat channel, an instant message channel, or an email channel.

5. The method of claim 4, wherein the messaging channel is an IRC chat channel.

6. The method of claim 4, wherein the messaging channel is a short message service (SMS) channel.

7. The method of claim 1, wherein one or more application programming interface (API) calls are utilized to submit the request to generate the payment request object to the digital wallet service.

8. The method of claim 2, wherein the user-provided information pertaining to the transaction comprises a shipping address and/or a selected shipping method.

9. The method of claim 1, wherein the user-provided information pertaining to the transaction comprises an identification of a payment instrument.

10. One or more computer-storage media having embodied thereon computer-usable instructions which, when executed by one or more processors, facilitate a method of utilizing a service-hosted payment request object for completing an online transaction between a vendor and a user, the method comprising:
    establishing a communication channel between a web agent of the vendor and a client device of the user, wherein communication occurs via a third-party messaging client that does not provide a front-end application of the vendor on the client device;
    via the communication channel, communicating to the client device an offer of a transaction provided by the vendor;
    receiving, via the communication channel, an acceptance of the transaction;
    submitting a request from the web agent to an online digital wallet service to generate the payment request object for the transaction, wherein the payment request object is cached by the digital wallet service, and wherein the payment request object contains details about the transaction provided by the vendor;
    receiving a reference to the payment request object from the digital wallet service, wherein the reference to the payment request object identifies the payment request object which is stored by the digital wallet service, and wherein the reference to the payment request object is configured, when selected by a user, to access a digital wallet interface associated with the digital wallet service;
    sending the reference to the payment request object to the client device, via the communication channel, for presentation on the client device;
    receiving, from the digital wallet service, an indication of user-provided information pertaining to the transaction, the user-provided information comprising information received by the digital wallet service via the digital wallet interface;
    determining a payment amount associated with the transaction, based at least in part on the user-provided information pertaining to the transaction;
    communicating the payment amount to the digital wallet service;
    receiving from the digital wallet service a payment token associated with the transaction, wherein receiving the payment token from the digital wallet service indicates that the digital wallet service received user confirmation of the transaction via the digital wallet interface on the client device; and
    completing the transaction based on the payment token received from the digital wallet service.

11. The one or more computer-storage media of claim 10, wherein communication between the web agent and the digital wallet service occurs via a back-end communication channel.

12. The one or more computer-storage media of claim 10, wherein the user-provided information pertaining to the transaction comprises a shipping address and/or a selected shipping method.

13. The one or more computer-storage media of claim 10, wherein the third-party messaging client is a chat client.

14. The one or more computer-storage media of claim 10, wherein the third-party messaging client is a short message service (SMS) client.

15. One or more computer-storage media having embodied thereon computer-usable instructions which, when executed by one or more processors, cause an online digital wallet service to perform a method of providing a service-hosted payment request object, the method comprising:

receiving a request from a vendor to generate the payment request object based on details provided by the vendor about an online transaction initiated between a vendor and a client device via a third-party messaging channel that does not provide a front-end application of the vendor on the client device;

generating the payment request object, wherein the payment request object contains the details about the online transaction;

caching the payment request object;

providing a reference to the payment request object to the vendor, wherein the reference to the payment request object identifies the payment request object, and wherein the reference is configured, when selected by a user, to request access to the cached payment request object;

receiving, from the client device, a request to access the cached payment request object, wherein receiving the request signifies that the user selected the reference on the client device;

responsive to receiving the request to access the digital wallet service, providing a digital wallet interface for presentation on the client device based on the cached payment request object, wherein the digital wallet interface presents to the user the details about the online transaction;

communicating, to the vendor, user-provided information pertaining to the transaction, the user-provided information comprising information received by the digital wallet service via the digital wallet interface on the client device;

receiving, from the vendor, a payment amount associated with the transaction;

communicating the payment amount for presentation on the digital wallet interface on the client device;

receiving, from the client device via the digital wallet interface, an indication to complete the transaction;

generating a payment token based on the payment amount associated with the transaction; and communicating the payment token from the digital wallet service to the vendor.

16. The one or more computer-storage media of claim 15, wherein communication with the vendor comprises communication with a bot associated with the vendor.

17. The one or more computer-storage media of claim 16, wherein providing the reference to the payment request object comprises communicating the reference to the payment request object to the user via a messaging session proxied by the digital wallet service between the bot and the user.

18. The one or more computer-storage media of claim 15, wherein communication between the digital wallet service and the vendor occurs via a back-end communication channel.

19. The one or more computer-storage media of claim 15, wherein the digital wallet interface comprises a web page communicated to a web browser on the client device.

20. The method of claim 1, wherein the digital wallet interface comprises a web page communicated to a web browser on the client device.

* * * * *